(12) United States Patent  
Nevis

(10) Patent No.: US 6,748,127 B2
(45) Date of Patent: Jun. 8, 2004

(54) TRANSMISSION OF ORTHOGONAL CIRCULAR POLARIZATIONS ON A FIBER

(75) Inventor: Elizabeth A. Nevis, Sunnyvale, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 104 days.

(21) Appl. No.: 10/097,907

(22) Filed: Mar. 13, 2002

(65) Prior Publication Data

US 2003/0174921 A1 Sep. 18, 2003

(51) Int. Cl.[7] .................................................. G02B 6/00
(52) U.S. Cl. ........................................ 385/11; 359/152
(58) Field of Search ............................ 385/11; 398/152

(56) References Cited

U.S. PATENT DOCUMENTS

| 5,648,848 A | 7/1997 | Aiyer |
| 5,724,136 A | 3/1998 | Zanoni |
| 2003/0035112 A1 * | 2/2003 | Nevis ........................ 356/487 |

FOREIGN PATENT DOCUMENTS

| EP | 271934 B1 * | 9/1995 | ............. G01J/4/00 |
| EP | 0 686 867 A1 | 12/1995 | |
| WO | WO 99/17129 | 4/1999 | |
| WO | WO 00/26682 | 5/2000 | |

OTHER PUBLICATIONS

Quenelle, Robert C. and Wuerz, Lawrence J., " A New Microcomputer–Controlled Laser Dimensional Measurement and Analysis System," Hewlett–Packard Journal, pp. 3–13 (Apr. 1983).

* cited by examiner

Primary Examiner—Rodney Bovernick
Assistant Examiner—Sung Pak

(57) ABSTRACT

A beam source for a heterodyne interferometer generates a beam containing components with different frequencies and respective orthogonal circular polarizations and directs the beam down an isotropic single-mode or few-mode optical fiber. Polarizations of light exiting the optical fiber are converted to orthogonal linear polarizations for use in the interferometer, where the frequency components are separated according to linear polarization. Crosstalk between left-handed and right-handed polarizations in the fiber is low, which permits clean separation of frequency components. A quarter-wave plate or other optical element that converts the polarization in the beam exiting the fiber has a mounting with tilt and roll angle adjustments to adjust to exit polarizations that depend on bends in the fiber. The fiber can have a rigid jacket or fast relaxation time to provide a stable output.

20 Claims, 1 Drawing Sheet

TRANSMISSION OF ORTHOGONAL CIRCULAR POLARIZATIONS ON A FIBER

BACKGROUND

Heterodyne interferometers typically use two light beams with slightly different frequencies (e.g., frequencies that differ by a few MHz). The two light beams are normally directed down different paths, a reference path that has a fixed length and a measurement path that includes a reflection from an object being measured. After traversing their respective paths, the beams are combined, and frequency or phase information extracted from the combination allows precise measurement of the object's movement.

One light source for a heterodyne interferometer is a Zeeman-split laser. A Zeeman-split laser can use a single laser cavity to produce a beam containing two frequency components with wavelengths a few MHz apart. The two components in the laser cavity have wavelengths that are highly stable, phase-locked, and circularly polarized with opposite phase delays making the polarizations of the two components orthogonal.

For visible light, a frequency difference of a few MHz such as in the beam from a Zeeman split laser is too small to permit beam dispersive elements such as prisms or diffraction gratings to separate the frequency components within a reasonable working distance (e.g., within 500 mm for beam diameters between 3 and 12 mm). Accordingly, a conventional separation technique converts the circular polarizations of the frequency components in the beam from a Zeeman-split laser into orthogonal linear polarizations, and a polarizing beamsplitter separates the frequency components according to their linear polarizations. Generally, the output optics of the laser includes a quarter-wave plate that converts the orthogonal circular polarizations into orthogonal linear polarizations, and a half-wave plate reorients the linear polarizations along "S" and "P" polarization directions for an interferometer's beamsplitter that separates the components.

In practice, the polarizations of the frequency components inside a laser cavity depart slightly from being perfectly circular, and the polarizations of the frequency components after the wave plates may not be perfectly linear or perfectly orthogonal. In particular, the frequency component intended to have the "P" polarization will have a small "S"-polarized component, and the frequency component intended to have the "S" polarization will have a small "P"-polarized component.

The interferometer's beamsplitter cannot distinguish two frequencies and instead (with ideal operation) separates components of the input beam according to polarization. As a result, the separated beams have a small frequency contamination respectively inherited from the "S" and "P" polarization components, which contain mixtures of frequencies before separation. Further, the interferometer's beamsplitter in actual operation fails to perfectly separate the polarization components, leading to further leakage of light of the wrong frequency into each separated beam.

A heterodyne interferometer typically measures the velocity of an object from the Doppler shift of a measurement beam reflected from the object. When the measurement beam and a reference beam are ideal monochromatic beams of slightly different frequencies, a beat frequency that is equal to the difference between the frequency of the Doppler-shifted measurement beam and the frequency of the reference beam can be compared to the original frequency difference between the beams. The variation in the beat frequency indicates the velocity of the object. However, frequency leakage superimposes other oscillations on the beat frequency and thereby can introduce a cyclic error in measurements. Precise measurements thus require the polarizations of the frequency components to be very linear and very orthogonal, for the cleanest possible separation of monochromatic measurement and reference beams.

Another concern in heterodyne interferometers is removing heat sources such as the laser from the thermal environment of the separated beams. Generally, the interferometer optics must be thermally protected from the laser to reduce thermal disturbance of beam paths and measurements. The thermal protection usually means keeping the laser separated from the interferometer optics and generally requires a mechanism for remote delivery of the beam from the laser to the interferometer optics.

One technique for delivering the beam from the laser sends the beam through an optical window into a thermally protected zone containing the interferometer optics. Mirrors can guide the beam into the thermally protected zone. This technique has difficulties in that precise and stable control of the beam generally requires mounting the laser and the interferometer optics on the same very stable frame, while still keeping the interferometer optics environmentally isolated from the laser.

Another technique for delivering the beam is to send the beam including both linear polarization components into a single polarization maintaining (PM) optical fiber. However, currently available PM fibers only provide extinction ratios (i.e., ratios of the preserved polarization to the orthogonal polarization) of up to about 20 dB, whereas precision interferometers typically require extinction ratios greater than about 35 dB, often closer to 50 dB. Generally, current PM fibers have too much crosstalk between the linearly polarized components to provide the clean frequency separation that good measurements require.

Yet another delivery technique separates the linear polarization components and sends the separated linearly polarized beams down separate PM fibers for recombination inside the protected zone of the interferometer. The initially good polarizations of the frequency components out of the laser allows a clean frequency split for input to the two PM fibers, and the beam combiner or auxiliary polarizers can clean up the individual polarizations of the beams exiting the PM fibers to compensate for the lower than desired extinction ratios of current PM fibers. However, some high-precision interferometers require very precise parallelism (e.g., microradian precision) for the frequency component beams. Passive opto-mechanical mounts have difficulties in achieving and maintaining the required level of parallelism over variations in temperature and through the vibrations and shock typically encountered during shipping and integration of an interferometer.

In view of the above-described limitations of current systems, heterodyne interferometers need additional systems and methods for thermally separating a laser or other beam source from interferometer optics while still producing cleanly separated monochromatic beams that are highly parallel.

SUMMARY

In accordance with an aspect of the invention, a beam containing left-handed and right-handed circularly polarized components of slightly different frequencies is sent from a laser or other beams source into an optical fiber. The optical fiber can be an isotropic optical fiber that is a single mode fiber for the wavelengths of the beam or single mode for a wavelength slightly longer than the beam's wavelengths. A quarter-wave plate can change the left-handed and right-handed circularly polarized components of the collimated output beam from the fiber into linearly polarized components, and half-wave plate can be adjusted to rotate the linear polarizations to produce the desired "S" and "P" polarizations at the plane of the interferometer beamsplitter.

One specific embodiment is a system including a light source, an optical fiber, and a polarizations conversion system. The light source, which can include a Zeeman split laser, generates a light beam that contains a first component having a left-handed polarization and a first frequency and a second component having a right-handed polarization and a second frequency. The optical fiber receives and conducts the light beam including the left-handed and right-handed components to a desired location such as a thermally protected zone of a heterodyne interferometer. The polarization conversion system, which is at an output of the optical fiber, converts the left-handed polarization of the first component to a first linear polarization and converts the right-handed polarization of the second component to a second linear polarization that is orthogonal to the first linear polarization. The optical fiber can be an isotropic fiber that is a single-mode fiber or a few-mode fiber for light having the first frequency and light having the second frequency.

Polarizations in the beam exiting the optical fiber generally depend on the bends and the temperature of the optical fiber, and the stability of the polarizations depends on the fiber being in mechanical and thermal equilibrium. The optical fiber can include a coating that reduces time for the optical fiber to reach mechanical equilibrium and/or a rigid jacket that resists dynamic bending. In the polarization conversion system, a quarter-wave plate can be mounted with an adjustable tilt angle and an adjustable roll angle to permit orienting the quarter-wave plate according to the properties of the left-handed and right-handed polarizations exiting from the optical fiber.

Another embodiment of the invention is a method for providing a heterodyne beam. The method includes: generating a light beam that contains a first component having a left-handed polarization and a first frequency and a second component having a right-handed polarization and a second frequency; coupling the light beam into an optical fiber; and converting the left-handed polarization and the right-handed polarization in the light beam exiting the optical fiber into respective linear polarizations, which are typically orthogonal to each other. A quarter-wave plate can convert the polarizations. A tilt angle and a roll angle of the quarter-wave plate can be adjusted to compensate for the effects that bends in the optical fiber have on the properties of the left-handed and right-handed polarizations exiting from the optical fiber.

DETAILED DESCRIPTION

Figure 1:
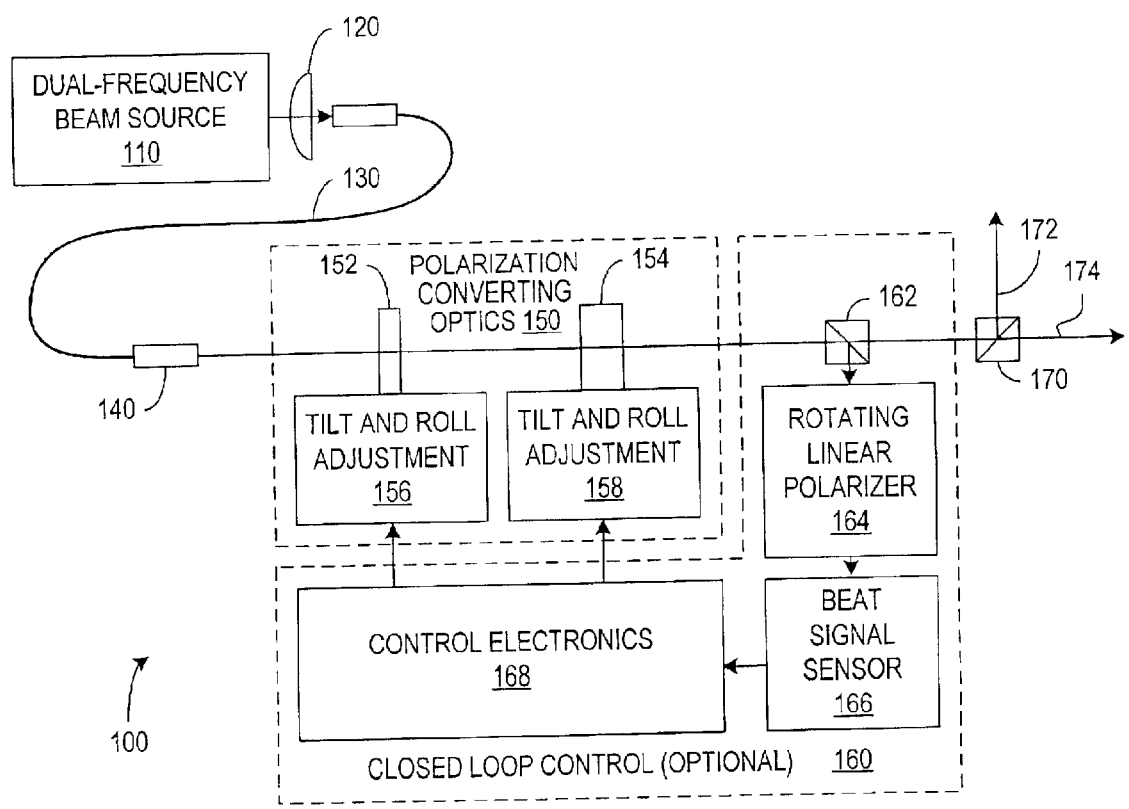
FIG. 1 shows a block diagram of a portion of a heterodyne interferometer in accordance with an embodiment of the invention.

A beam source for a heterodyne interferometer sends a beam having a first component with a first frequency and predominantly left-handed circular or elliptical polarization and a second component with a second frequency and a predominantly right-handed circular or elliptical polarization through an optical fiber to the optics of the heterodyne interferometer. The optical fiber can be an isotropic, single-mode fiber at the frequencies of the components or "few-mode" fiber (i.e., a single mode fiber at a slightly lower frequency). A quarter-wave plate or other optical element at the output of the fiber converts the left-handed and right-handed polarizations of the components of the collimated beam exiting the optical fiber to orthogonal linear polarizations for use in the heterodyne interferometer.

FIG. 1 is a block diagram of a system 100 for providing an input beam to a heterodyne interferometer. System 100 includes a dual-frequency beam source 110, an adjustable launcher 120, an optical fiber 130, a collimator 140, polarization converting optics 150, a closed loop control system 160, and a polarizing beamsplitter 170.

Dual-frequency beam source 110 produces a beam containing two frequency components having slightly different frequencies. Typically, the two frequencies differ by about 1 to 4 MHz in the output of a Zeeman-split laser, but larger frequency separation up to 400 MHz or more can be achieved using accousto-optic modulators (AOMs) or other devices. Each of the frequency components has a left-handed or right-handed polarization that is orthogonal to the polarization of the other frequency component.

An exemplary embodiment of beam source 110 is a commercially available He—Ne laser head such as one of the 5517 series of laser heads available form Agilent Technologies, Inc., but beam source 110 lacks output optical elements that normally convert circular cavity polarizations into linear polarizations. Zeeman splitting in the 5517 series laser heads can generate a heterodyne beam having frequency components with a frequency difference of about 1.5 to 3 MHz and an average frequency of about 474 GHz (or wavelength of about 633 nm).

Adjustable launcher 120 couples the beam from beam source 110 into optical fiber 130. Such launchers are well known in the art and include for example the "Fiber Port" available from Optics for Research of Caldwell, N.J. Launcher 120 can optionally be mounted directly on a He—Ne laser tube to minimize pointing instability, minimize part count, and maximize transmission efficiency.

Optical fiber 130 carries the beam from beam source 110 to collimator 140. In an exemplary embodiment of the invention, optical fiber 130 is an isotropic single-mode fiber or a few-mode fiber for the frequencies of light in the beam from beam source 110. A few-mode fiber is an optical fiber that is a single-mode fiber for light having a slightly longer wavelength (or low frequency) than the light coupled into the fiber. In the exemplary embodiment of the invention, optical fiber 130 is a standard single-mode fiber from a commercial supplier such as 3M, Inc. In particular, a single-mode fiber for 633-nm light or a single-mode fiber for 820-nm light, which is a few-mode fiber for 633-nm light.

When polarized light traverses optical fiber 130, the output polarization can take a wide range of forms depending on bending and the temperature of optical fiber 130. The polarizations can change during dynamic bending or temperature changes of the fiber but stabilize when optical fiber 130 reaches thermal and mechanical equilibrium. Optical fiber 130 can have a rigid or semi-rigid jacket to limit dynamic bending. Alternatively, to hasten the mechanical stabilization, fiber 130 can have a "floppy" coating such as provide on some optical fibers commercially available from 3M, Inc. Floppy coatings reduce the kinking and snarling caused by a fiber's mechanical memory of being wound on a spool and may reduce the time required for optical fiber 130 to relax to mechanical equilibrium. Optical fiber 130 with or without the floppy coating can be inside a loose-fitting, rigid or semi-rigid jacket that limits movement of optical fiber 130.

Other techniques for minimizing the effects of dynamic bending of optical fiber 130 include: stripping out marginal modes using static, tight bends and twists or pinching strategic points along optical fiber 130; or under filling the numeric aperture of optical fiber 130 at launcher 120 and avoiding sharp bends; or slightly defocusing launcher 120, which loses some power but makes system 100 less sensitive to small motion at the input end of optical fiber 130.

Collimator 140 provides a collimated beam containing two monochromatic, left-handed and right-handed polarized components that have slightly difference frequencies. Both components exit from the same fiber (optical fiber 130) and are therefore constrained to be collinear, unlike in systems using separate fibers for separated beams.

The crosstalk between the frequency components having left-handed and right-handed polarizations is generally much lower than the crosstalk in systems that send two orthogonal, linear polarized components down a single polarization maintaining fiber. Circularly polarized light evidently undergoes less depolarization from scattering at the core-clad interface in an optical fiber. A few-mode fiber having a larger core may also provide low light intensities at the core-clad interface to further reduce the depolarization.

The extinction ratio and null depth of a fiber are measures of how well optical fiber 130 preserves the polarization of an input beam and how well optical fiber 130 keeps the polarizations of the two frequency components orthogonal. In particular, the extinction ratio for a particular input polarization is the ratio of the magnitudes of a contaminant polarization and the desired polarization in the output beam when an input beam has the particular polarization. The null depth depends on the ratio of the power at the desired frequency to the power at the contaminant frequency after separation of the components by polarization.

A concern during operation of system 100 is stability of the null depth. Isotropic fibers were generally found to provide an extinction ratio that varied by less than 5% over an extended interval (more than 3 minutes) for undisturbed fibers.

Single-mode isotropic fibers have been found to provide good results having deep nulls and extinctions ratios. Few-mode fibers (i.e., single-mode fibers for a somewhat longer wavelength; e.g., single mode fibers for 800–1300 nm when used with 633 nm light) can also provide deep nulls and extinctions ratios, but few-mode fibers may be less stable with changes in the bends or temperature of fiber 130. The output propagation angle is also more sensitive to bending with few-mode fibers.

In the embodiment of FIG. 1, polarization converting optics 150 includes a quarter-wave plate 152 and a half-wave plate 154 with separate wave plate mounting systems 156 and 158. Quarter-wave plate 152 changes the left-handed and right-handed polarizations of the components of the collimated beam from collimator 140 so that the beam exiting quarter-wave plate 152 contains two monochromatic, linearly polarized components, which are still collinear in the same beam. Half-wave plate 154 then rotates the linear polarizations of the components so that one component has the "S" polarization and the other component has the "P" polarization of the heterodyne interferometer.

Mounting systems 156 and 158 provide independent roll and tilt adjustments of respective wave plates 152 and 154. Preferably, wave plates 152 and 154 should have sufficient apertures to avoid clipping and power loss over the adjustment ranges of mounting systems 156 and 158. Generally, adjustment of the tilt of quarter-wave plate 152 can ensure that the output linear polarizations are orthogonal. With a full roll adjustment and significant two-axis, tilt adjustment (e.g., ±10 to 15° on each of two perpendicular axes), mounting systems 156 and 158 can adjust to variations in polarizations and propagation directions that result from the particular configuration and temperature of optical fiber 130 and thereby permit wave plates 152 and 154 to produce an output beam with linear, orthogonal, correctly oriented polarizations, and extinction ratios greater than about 35 dB.

Optional closed loop control system 160 operates mounting systems 156 and 158 to dynamically adjust the orientation of wave plates 152 and 154 as required to compensate for rapid changes in polarizations that result when rearranging bends in fiber 130 or slower changes in polarization that result when fiber 130 settles into position.

In the embodiment of FIG. 1, control system 160 includes a non-polarizing beam splitter 162, a rotating linear polarizer 164, a beat signal sensor 166, and control electronics 168. Non-polarizing beam splitter 162 directs a weak sample (e.g., about 4%) of the beam power out of polarization converting optics 150 to rotating linear polarizer 164. Rotating linear polarizer 164 has a pass axis that constantly rotates around the optic axis of the sample beam. Mechanically rotating a linear polarizer or using the properties of liquid crystals or materials with birefringence induced by stress, electric or magnetic fields, or acoustic excitation can achieve this axis rotation. Beat signal sensor 166 is an AC receiver that picks up the beat signal of whatever light passes through linear polarizer 164. Control electronics 168 then reads this beat signal synchronously with the angle of the pass axis of rotating linear polarizer 164 and determines the depths and angles of the nulls while system 100 settles to equilibration, is adjusted, and operates to measure the movement of an object.

For active control of system 100, control electronics 168 track of the pass-axis angle of linear polarizer 164 to within about 5 to 10 arcseconds, while AC receiver 166 measures the amplitude of the beat signal. At the pass-axis angles corresponding to the polarizations of each component beam, the beat signal goes through a minimum or "null" because the only contribution to the beat signal is the minimized leakage of the other frequency. The nulls are about 90° apart, and a maximum beat signal that covers a much broader angular range (a few degrees) of pass-axis rotation is half-way between consecutive nulls. Control electronics 168 tracks both the null depths (e.g., the difference between the maximum and minimum in dB) and the angular positions of the pass axis corresponding to the nulls. Control electronics 168 adjust the orientation of quarter-wave plate 152 to make the nulls deeper (i.e., to make the output polarizations more linear and as close to orthogonal as possible). Control electronics 168 adjust the orientation of half-wave plate 154 to line up the orthogonal linear polarizations with the interferometer axes. The latter is calibrated on installation of the interferometer system.

In the interferometer, polarizing beamsplitter 170 receives the output beam from polarization converting optics 150 and forms separate beams 172 and 174. Polarizing beamsplitters are well known in the art and commonly contain birefringent materials or a coating that reflects light having the "P" linear polarization and transmits light having the orthogonal "S" polarization. Polarizing beamsplitter 170 thus separates beam components according to linear polarizations. Intensity and spectral analysis or comparison of the separated beams 172 and 174 indicates how well the orthogonal polarizations were preserved and how cleanly the frequency components were separated.

One calibration operation for system 100 waits until fiber 130 reaches thermal and mechanical equilibrium and then adjusts the tilt of quarter wave plate 152 to produce components with linear, orthogonal polarizations. Generally, reaching mechanical equilibrium can require from seconds to minutes with standard 3 mm PVC-jacketed fiber, depending on the magnitude of the disturbance and the proximity of solid support structures (for example, a fiber partially resting on a table equilibrates in a shorter time than a fiber hanging in midair). The orientation angles of quarter-wave plate 152 are then adjusted to achieve the deepest nulls in the beams that beamsplitter 170 separates. Half-wave plate 154 is then adjusted in the output beam to achieve the desired linear polarization.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A system comprising:
    a source of a light beam that contains a first component having a left-handed polarization and a first frequency and a second component having a right-handed polarization and a second frequency;
    an optical fiber disposed to receive the light beam and conduct the light beam; and
    a polarization conversion system at an output of the optical fiber, the polarization conversion system converting the left-handed polarization of the first component to a first linear polarization and converting the right-handed polarization of the second component to a second linear polarization that is orthogonal to the first linear polarization.

2. The system of claim 1, wherein the source of the beam comprises a Zeeman split laser.

3. The system of claim 2, wherein the source of the beam further comprises a launcher, the launcher being mounted on a tube in the Zeeman split laser and acting to couple the light beam into the optical fiber.

4. The system of claim 1, wherein the optical fiber comprises an isotropic fiber.

5. The system of claim 4, wherein the optical fiber is a single-mode fiber for light having the first frequency and light having the second frequency.

6. The system of claim 4, wherein the optical fiber is a few-mode fiber for light having the first frequency or light having the second frequency.

7. The system of claim 1, wherein the optical fiber comprises a coating that reduces time for the optical fiber to reach mechanical equilibrium.

8. The system of claim 1, further comprising a rigid jacket that contains the optical fiber and resists bending.

9. The system of claim 1, wherein the polarization conversion system comprises a quarter-wave plate.

10. The system of claim 9, wherein the polarization conversion system further comprises a mount containing the quarter-wave plate, the mount being adjustable to control a tilt angle of the quarter-wave plate to adjust for bends in the optical fiber.

11. The system of claim 9, wherein the polarization conversion system further comprises a mount containing the quarter-wave plate, the mount being adjustable to control a roll angle of the quarter-wave plate to adjust elliptical properties of the left-handed and right-handed polarizations exiting from the optical fiber.

12. The system of claim 9, further comprising a closed loop control system connected to dynamically adjust an orientation of the quarter-wave plate according to measured properties of an output beam of the polarization conversion system.

13. The system of claim 9, wherein the polarization conversion system comprises a half-wave plate.

14. The system of claim 13, wherein the polarization conversion system further comprises:
    a first mount containing the quarter-wave plate; and
    a second mount containing the half-wave plate, the first and second mounts being independently adjustable to control orientations of the quarter-wave plate and the half-wave plate to adjust for bends in the optical fiber.

15. The system of claim 13, further comprising a closed loop control system connected to dynamically adjust orientations of the quarter-wave plate and the half-wave plate according to measured properties of an output beam of the polarization conversion system.

16. A method for providing a heterodyne beam comprising:
    generating a light beam that contains a first component having a left-handed polarization and a first frequency and a second component having a right-handed polarization and a second frequency;
    coupling the light beam into an optical fiber; and
    converting the left-handed polarization of the first component to a first linear polarization and the right-handed polarization of the second component to a second linear polarization that is orthogonal to the first linear polarization to produce an output beam in which the first component and the second component are linearly polarized and substantially collinear.

17. The method of claim 16, wherein converting the left-handed and right-handed circular polarizations comprises directing a beam from the optical fiber through a quarter-wave plate.

18. The method of claim 17, further comprising adjusting a tilt angle of the quarter-wave plate to compensate for bends in the optical fiber so that the first and second components of the light beam have respective orthogonal, linear polarizations upon exiting the quarter-wave plate.

19. The method of claim 17, further comprising adjusting a roll angle of the quarter-wave plate according to elliptical properties of the left-handed and right-handed polarizations exiting from the optical fiber.

20. The system of claim 1, wherein the polarization conversion system produces an output beam in which the first component and the second component are substantially collinear, the first component in the output beam having the first linear polarization and the first frequency and the second component in the output beam having the second linear polarization and the second frequency.

* * * * *